US011509958B2

(12) United States Patent
Gibbon et al.

(10) Patent No.: US 11,509,958 B2
(45) Date of Patent: *Nov. 22, 2022

(54) AUTOMATED CONTENT SELECTION FOR GROUPS

(71) Applicant: AT&T Intellectual Property I, L.P., Atlanta, GA (US)

(72) Inventors: David Crawford Gibbon, Lincroft, NJ (US); Yadong Mu, Middletown, NJ (US); Lee Begeja, Gillette, NJ (US); Bernard S. Renger, New Providence, NJ (US); Raghuraman Gopalan, Dublin, CA (US); Behzad Shahraray, Holmdel, NJ (US); Zhu Liu, Marlboro, NJ (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,263

(22) Filed: May 14, 2021

(65) Prior Publication Data
US 2021/0274254 A1 Sep. 2, 2021

Related U.S. Application Data

(63) Continuation of application No. 16/732,455, filed on Jan. 2, 2020, now Pat. No. 11,039,210, which is a
(Continued)

(51) Int. Cl.
H04N 21/45 (2011.01)
H04N 21/25 (2011.01)
(Continued)

(52) U.S. Cl.
CPC ....... *H04N 21/4532* (2013.01); *H04N 21/214* (2013.01); *H04N 21/252* (2013.01);
(Continued)

(58) Field of Classification Search
CPC .................................................. H04N 21/4532
See application file for complete search history.

(56) References Cited

U.S. PATENT DOCUMENTS 6,917,979 B1 7/2005 Dutra et al.
7,515,136 B1 4/2009 Kanevsky et al.
(Continued)

FOREIGN PATENT DOCUMENTS

CN 101034455 A 9/2007
CN 102027498 A 4/2011
(Continued)

OTHER PUBLICATIONS

"Polycom® RealPresence Centro™", http://www.polycom.com/content/dam/polycom/common/documents/brochures/realpresence-centro-brochure-enus.pdf, Discloses a multi-display system designed for work groups, classrooms and teams that uses proximity sensors to enable responsive intelligence and preserve intimacy., 2015.
(Continued)

*Primary Examiner* — Michael H Hong
(74) *Attorney, Agent, or Firm* — Guntin & Gust, PLC; Mark Wilinski

(57) ABSTRACT

Aspects of the subject disclosure may include, for example, a system and method for selecting media content for a group of persons located at a venue. The system and method identify a plurality of viewers in a vicinity of a venue that has one or more display devices from location data and extracts a content viewing preference of each viewer from their profile data. The process includes aggregating the content viewing preference of each of the plurality of
(Continued)

viewers to generate an aggregated content profile. Based on the aggregated content profile, a list of content is generated. Next, a first group of viewers approaching a viewing range of a display device are sensed by imaging data. Any conflicts between content viewing preferences of the first group of viewers are detected and resolved based on weighting the viewing preferences of the group. Other embodiments are disclosed.

20 Claims, 5 Drawing Sheets

Related U.S. Application Data continuation of application No. 16/114,624, filed on Aug. 28, 2018, now Pat. No. 10,560,745, which is a continuation of application No. 15/226,630, filed on Aug. 2, 2016, now Pat. No. 10,091,550.

(51) Int. Cl.
*H04N 21/482* (2011.01)
*H04N 21/214* (2011.01)
*H04N 21/258* (2011.01)
*H04N 21/442* (2011.01)

(52) U.S. Cl.
CPC . *H04N 21/25841* (2013.01); *H04N 21/44226* (2020.08); *H04N 21/4524* (2013.01); *H04N 21/4826* (2013.01)

(56) References Cited

U.S. PATENT DOCUMENTS

| | | | |
|---|---|---|---|
| 8,024,223 B2 | 9/2011 | Cradick et al. | |
| 8,126,774 B2 | 2/2012 | Hendrickson et al. | |
| 8,260,266 B1 | 9/2012 | Amidon et al. | |
| 8,751,427 B1 | 6/2014 | Mysen et al. | |
| 8,781,968 B1 | 7/2014 | Bushman et al. | |
| 8,812,361 B2 | 8/2014 | Petronelli et al. | |
| 8,924,250 B2 | 12/2014 | Young et al. | |
| 9,071,370 B2 | 6/2015 | Toner et al. | |
| 9,135,352 B2 | 9/2015 | Kanakarajan et al. | |
| 9,292,250 B2 | 3/2016 | Krig et al. | |
| 10,091,550 B2 | 10/2018 | Gibbon et al. | |
| 2004/0010800 A1 | 1/2004 | Goci et al. | |
| 2007/0024580 A1 | 2/2007 | Sands et al. | |
| 2007/0240183 A1* | 10/2007 | Garbow | H04N 21/466 725/38 |
| 2008/0270579 A1 | 10/2008 | Herz et al. | |
| 2009/0187936 A1 | 7/2009 | Parekh et al. | |
| 2010/0080163 A1 | 4/2010 | Krishnamoorthi et al. | |
| 2010/0197318 A1 | 8/2010 | Petersen et al. | |
| 2011/0035282 A1* | 2/2011 | Spatscheck | G06Q 30/0273 705/14.69 |
| 2011/0051646 A1 | 3/2011 | Rice | |
| 2011/0075612 A1 | 3/2011 | Guo et al. | |
| 2011/0302026 A1 | 12/2011 | Kanakarajan et al. | |
| 2012/0036523 A1 | 2/2012 | Weintraub et al. | |
| 2012/0046018 A1 | 2/2012 | Bunting | |
| 2012/0266191 A1 | 10/2012 | Abrahamsson et al. | |
| 2013/0332527 A1* | 12/2013 | Du | G06Q 10/10 709/204 |
| 2014/0052534 A1 | 2/2014 | Gandhi et al. | |
| 2014/0214543 A1 | 7/2014 | Gandhi et al. | |
| 2014/0223327 A1 | 8/2014 | Mantripragada et al. | |
| 2014/0237361 A1* | 8/2014 | Martin | G06F 16/4387 715/716 |
| 2014/0379477 A1 | 12/2014 | Sheinfeld et al. | |
| 2015/0024779 A1 | 1/2015 | Hwang et al. | |
| 2015/0026708 A1 | 1/2015 | Ahmed et al. | |
| 2015/0046269 A1 | 2/2015 | Liu et al. | |
| 2015/0148082 A1 | 5/2015 | Waisel et al. | |
| 2015/0193826 A1 | 7/2015 | Canoy | |
| 2016/0012048 A1 | 1/2016 | Yellin et al. | |
| 2016/0071542 A1 | 3/2016 | Toyama et al. | |
| 2016/0110585 A1 | 4/2016 | Govindaraj et al. | |
| 2016/0127763 A1 | 5/2016 | Patel et al. | |
| 2016/0274744 A1 | 9/2016 | Neumann et al. | |
| 2018/0041805 A1 | 2/2018 | Gibbon et al. | |
| 2018/0367855 A1 | 12/2018 | Gibbon et al. | |
| 2020/0137454 A1 | 4/2020 | Gibbon et al. | |

FOREIGN PATENT DOCUMENTS

| | | |
|---|---|---|
| GB | 2527744 | 1/2016 |
| JP | 2003330396 A | 11/2003 |
| KR | 2012139251 | 12/2012 |
| WO | 2014207740 A1 | 12/2014 |
| WO | 2015070290 A1 | 5/2015 |
| WO | 2015103465 | 7/2015 |
| WO | 2016041585 | 3/2016 |

OTHER PUBLICATIONS

"TouchTunes Launches Attract Media", http://www.businesswire.com/news/home/20150414006036/en/TouchTunes-Launches-Attract-Media, Discloses Attract Media's cross screen platform that serves to both amplify messaging and activate consumers via: TVs: video and display advertising, publisher content, and real-time social feeds, 2015.

Daniel, Vogel , "nteractive Public Ambient Displays: Transitioning from Implicit to Explicit, Public to Personal, Interaction with Multiple Users", http://www.dgp.toronto.edu/~ravin/papers/uist2004_ambient.pdf, Discloses design principles and an interaction framework for sharable, interactive public ambient displays that support the transition from implicit to explicit interaction with both public and personal information, 2004.

Elizabeth, Churchill , "The Plasma Poster Network", http://www.fxpal.com/publications/the-plasma-poster-network-social-hypermedia-on-public-display.pdf, Discloses work that "focuses on promoting community information sharing in public spaces using large screen, interactive, digital poster boards called the Plasma Posters.", 2013.

\* cited by examiner

200

AUTOMATED CONTENT SELECTION FOR GROUPS

CROSS-REFERENCE TO RELATED APPLICATIONS

This application is a Continuation of U.S. patent application Ser. No. 16/732,455, filed Jan. 2, 2020, which is a Continuation of U.S. patent application Ser. No. 16/114,624, filed Aug. 28, 2018 (now U.S. Pat. No. 10,560,745), which is a Continuation of U.S. patent application Ser. No. 15/226,630, filed on Aug. 2, 2016 (now U.S. Pat. No. 10,091,550). All sections of the aforementioned applications and patents are incorporated herein by reference in their entirety.

FIELD OF THE DISCLOSURE

The subject disclosure relates to automated tools for content selection for groups of persons.

BACKGROUND

Content, including media content, is typically experienced by consumers via devices such as computers, televisions, radios, and mobile electronics. Media content can be delivered by service providers, who send the content, such as television, radio, and video programming, to consumers for enjoyment at their physical locations. As network capabilities expand, new opportunities to enhance the ability for consumers to enjoy content by experiencing a variety of content. Intelligent devices offer means to enhance the enjoyment of content in ways that anticipate consumer personalization of media content presentation.

BRIEF DESCRIPTION OF THE DRAWINGS

Reference will now be made to the accompanying drawings, which are not necessarily drawn to scale, and wherein.

DETAILED DESCRIPTION

Figure 1:
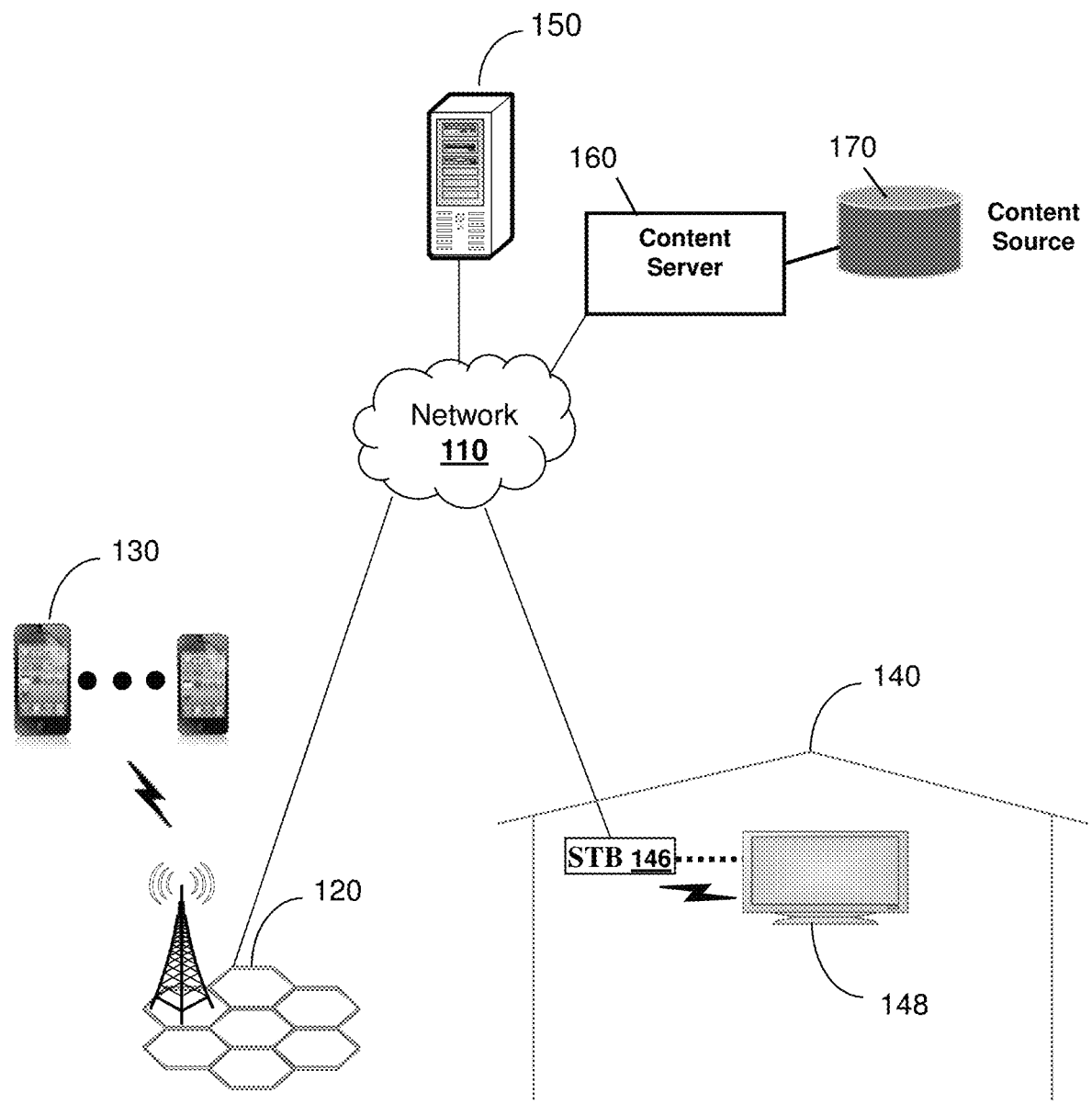
FIG. 1 depicts an illustrative embodiment of a system for automated selection of content for a group of persons physically present at a venue.

The subject disclosure describes, among other things, illustrative embodiments for automated tools for content selection. Mobile telecommunications and entertainment service providers may have access to anonymous data gathered during the course of business about the location, content subscriptions, and prior content viewing choices of subscribers. The system includes a service that permits participants to securely post their location. The service determines when participants are co-located or in close proximity to a display and each other, and automatically selects content for viewing on that nearby display. Other embodiments are described in the subject disclosure.

One or more aspects of the subject disclosure include a method for identifying from location data a plurality of viewers in a vicinity of a venue that has one or more display devices; obtaining profile data associated with each viewer that includes a content viewing preference of each viewer; aggregating the content viewing preference of each of the plurality of viewers according to the profile data of each viewer to generate an aggregated content profile; creating an ordered list of content for display on the one or more display devices based on the aggregated content profile; ranking the one or more display devices in the venue; mapping content items from the ordered list of content to the one or more display devices based on the ranking; and sending the content items from the ordered list of content to the one or more display devices according to the mapping so that they can be displayed.

One or more aspects of the subject disclosure include a mobile device that has a processing system including a processor and a memory that stores executable instructions for the processor to execute that causes the mobile device to perform operations. The mobile device or the service provider may provide location data to a content selection system indicating a vicinity of a viewer to a venue with one or more display devices. The mobile device or the service provider may provide profile data associated with the viewer that includes what content the viewer prefers. The mobile device receives notices from the content selection system that indicate when a conflict arises concerning the content viewing preferences of a first group of viewers concerning content items on a list of content and sends a preference for one or more content items on the list of content to the content selection system.

One or more aspects of the subject disclosure include a system for automatically choosing content for a group of people at a venue. The system identifies a plurality of viewers in a vicinity of a venue comprising one or more display devices from location data and creates an aggregated content viewing profile from the profile data of the plurality of viewers. The system will generate a list of content for displaying on the one or more display devices based on the aggregated content profile, and can sense a first group of viewers of the plurality of viewers approaching a viewing range of a display device from imaging data. The system may detect a conflict between the viewing preferences of the first group of viewers and can resolve the conflict based on weighting the viewing preferences of the first group of viewers, thereby creating a content selection from the list of content. Finally, the system displays content from the list of content according to the content selection.

FIG. 1 depicts an illustrative embodiment of a system for automated selection of content for a group of persons physically present at a venue. As illustrated in FIG. 1, system 100 comprises a network 110, a wireless network 120, a plurality of location tracking devices 130, a premises or venue 140 comprising a set-top box 146 and a display 148, a control server 150, a content server 160 and a content source 170. A single network 110 is illustrated for the sake of simplicity; however, it should be understood that network 110 may comprise a plurality of related or unrelated networks that provide delivery of location tracking communications and delivery of media content for viewing. Location tracking devices 130 may comprise cell phones, GPS, or other devices kept by participants that enable a participant to securely provide data concerning his location. Such location information may be relayed through wireless network 120 and network 110 to control server 150. Other location gathering technologies well-known in the art may be employed, such as multilateration or facial recognition. In one or more embodiments, registered participants agree to provide content subscriptions, prior content viewing choices, schedule or reservation location information, and demographic information, by an opt-in process. In the system 100, participants securely post their location and the system determines when participants are co-located or in close proximity to other participants that have entered the venue 140 that has one or more displays for viewing content, the proximal participants thereby forming a viewing group. The system 100 then selects content for presentation at the one or more displays to the viewing group.

A single control server 150 is illustrated for the sake of simplicity; however, it should be understood that control server 150 may comprise a plurality of servers operating in a distributed environment, or that functions performed by control server 150 may reside in content server 160, or vice-versa. Additionally, the functions of control server 150 may be distributed on mobile devices 130.

In one or more embodiments, the system 100 can provide media content to the venue 140 via the network 110. For example, a subscription content service provide content of any type, such as broadcast television, premium television, video on demand, and/or pay-per-view television. The content can be software content, including entire software programs, upgrades to programs, and/or additions to programs. The content can be subscription-based content (e.g., premium television channels, streaming content services) and/or non-subscription-based (e.g., "free" over-the-air television content and/or single offers or purchases of content).

In one embodiment, the system 100 can include one or more content servers 160 that can receive content from one or more content sources 170. Content servers 160 can provide content through one or more delivery networks to the venue 140. For example, a content server 160 can deliver media content services via an internet protocol television network, as set forth in more detail below.

At the venue 140, a single set-top box 146 and display 148 are illustrated for the sake of simplicity; however, it should be understood that the display 148 may comprise electronics to enable rendering media content for viewing purposes without the set-top box 146. In addition, it should also be understood that the venue 140 may comprise multiple displays, with or without associated set-top boxes. For example, there may be more than one display, and the displays may not be of uniform size. There may be a large central display and several smaller displays, or there may be a picture-in-picture scenario where two logical displays share the same physical display. In these cases, the service can create a rank ordered list that can be mapped to the displays. The displays may have a natural priority ranking based on their size or prominence or location (as with different seating tiers in a theater) in the venue 140, and the ordered list of content can be commensurately mapped to the display ranking. In addition, extending this multiple display analogy further, a participant's mobile device may act as a lowest ranking display in the group of displays. In one scenario, for example, if only one person is interested in a particular video channel, that channel can be displayed on his or her personal smart phone.

The system 100 can further include authentication functions to ensure that media content is distributed only to verified subscribers of the system 100, the networks 110 and/or the content server 160 according to service plan levels of those subscribers. For example, the system 100 can verify that a set-top box 146 is properly identified and validated for receiving media content over the system 100. For example, one or more authentication servers can be used to verify the subscription status of the set-top box 146. Device identifying information, such as MAC address, IP address, and/or SIM card information, or the like can be transmitted to an authentication server. An authentication server can use this identifying information from the set-top box 146 to inquire at a subscriber database of service plan information for a subscriber who is associated with the set-top box 146. The subscriber database can provide subscription status and service plan information to allow the authentication server to enable delivery of purchased media content to the set-top box 146.

When groups of people gather in a public space, such as the venue 140, and view content on a shared display 148, or multiple shared displays, there are several problems that arise: (1) a subset of the group may not be authorized to view the content. They may not have subscribed to the content provider, or may not have paid to view the particular content item. The content providers would not be compensated for these viewers; (2) the owner of the venue 140 may have to pay a high price to the content provider for the rights to display the content to patrons; (3) the group of viewers may not have common viewing interests; (4) the group may include minors who should not view all types of content, or may include families where parents may not wish their children to view certain types of content; and (5) the products being advertised within the content may not be of interest to the group of viewers.

In one or more embodiments, the system 100 can select media content based on a number of techniques and criteria, such as based on user input, user preferences, user profiles, monitored user viewing history, and so forth. The system 100 resolves the several problems identified above, with or without placing a burden on the participants (such as using mobile applications, 'checking in', voting, engaging in dialog with strangers, etc.). The system 100 includes a service where participants securely post their location and the service determines when participants are co-located or in close proximity. In one embodiment, the service is implemented by control server 150. Although the participants of the system 100 may benefit from viewing content of interest without providing any actions to indicate their presence in the venue 140 and proximity to display 148, the information maintained by the service (including which content is of likely interest to people currently present in the venue 140) can be used in a scenario where the users provide active content preference specification such as voting, paying, bidding, etc. One way in which the information can be used is to limit the content choices (voting candidates) to a small, manageable set that can easily be selected from a single mobile phone screen, for example.

In the case of parental controls, the service consults a database of predefined user preferences dynamically so that when a child makes a content selection, the service will grant access only if the parent is in close proximity and has given prior consent to such access. In an alternative embodiment, the parents may receive a notification and grant access, possibly from a remote location. In this alternative embodiment, there is a presumption that the children have location tracking devices, such as smartphones. However, another option would be for child's toys or wearable devices to include location sensors with the ability to wirelessly transmit their location.

In an exemplary embodiment where the venue 140 is, for example, a restaurant or bar, the content displayed on one or more displays in the venue 140 may be determined by a series of steps performed by control server 150. In one embodiment, the content selection process may include: 1) determining what content sources the participants in the viewing group are subscribed to, i.e., the available content; 2) optionally creating a list of favorite content for each participant in the viewing group based on prior viewing of explicitly expressed content preferences from the available content; 3) determining which content maximizes the total preferences of the viewing group subject to the constraint that all viewing group participants have subscribed to the content, and 5) sending a signal (or sending a content stream) to display the selected content at the one or more displays to the viewing group.

Figure 2:
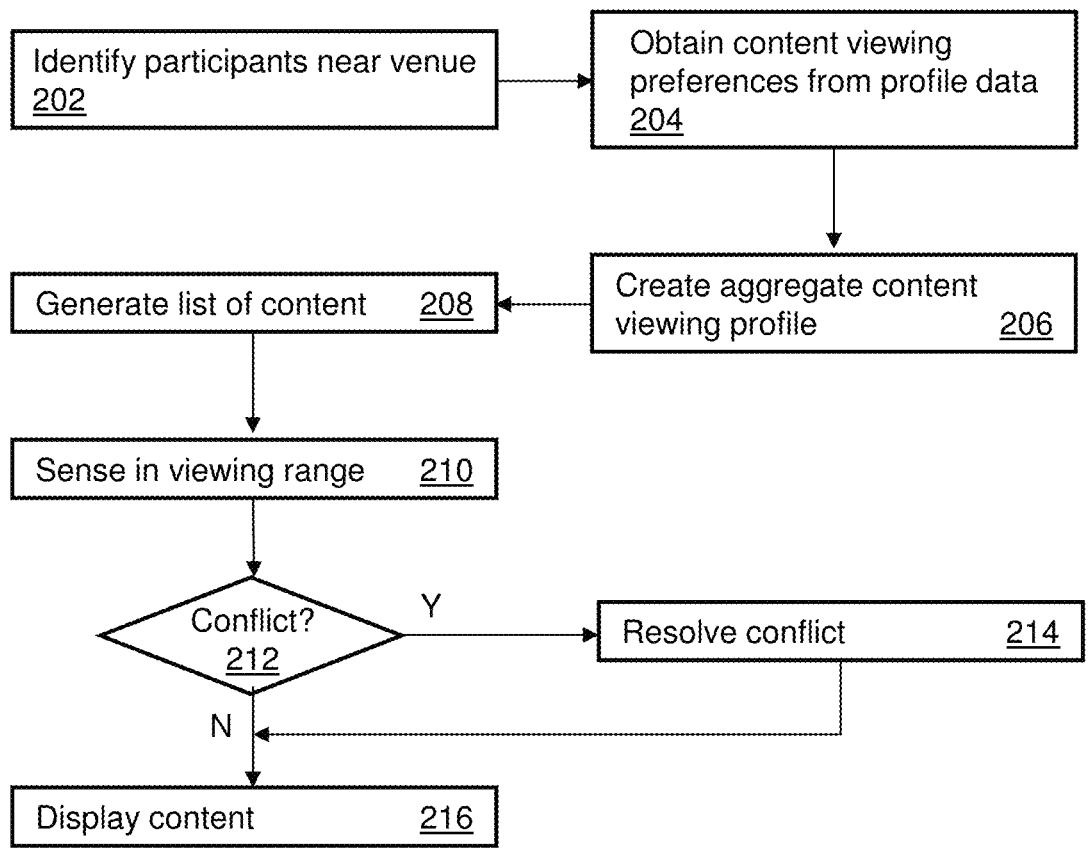
FIG. 2 depicts an illustrative embodiment of a method used in portions of the system 100 described in FIG. 1 to automatically select and display content.

FIG. 2 depicts an illustrative embodiment of a method used by system 100 to automatically select and display content.

In step 202, the system 100 identifies from location data a plurality of viewers in a vicinity of a venue comprising one or more display devices.

Next, in step 204, the system 100 obtains profile data associated with each viewer of the plurality of viewers to obtain a content viewing preference of each viewer.

Next, in step 206, the system 100 aggregates the content viewing preference of each of the plurality of viewers from the profile data of each viewer to generate an aggregated content profile. The aggregated content profile helps to determine which content maximizes the total preferences of the viewing group. Optionally, the aggregated content profile may be subject to a constraint that all viewing group participants have subscribed to the content.

Next, in step 208, the system 100 generates a list of content for displaying on the one or more display devices based on the aggregated content profile determined in step 206. In another embodiment, the content selected may be determined by the prior location of participants forming the viewing group. For example, if most of the viewing group has been to a sports arena, the content that is chosen for display to the group in the venue 140 can be related to the home sports team for that arena.

In another embodiment, the venue operator may control the available content. For example, in a sports bar, and the venue operator may restrict the available content to sporting events or other sports related content. In another example, content displayed at a daycare center may be restricted to children's content. In another example, the venue operator may extent the available content beyond that of the participants' subscriptions, based on the terms of the venue subscription with the content provider. In addition, the venue operator may bias the content selection process based on participant characteristics (i.e., revenue, loyalty, etc.) by awarding loyalty credits to the participants and weighting the content selection based on loyalty credits. For example, the loyalty credits may be awarded based on the spending habits of each participant, or based on how frequently the participant patronizes the venue (i.e., frequency of attendance).

The content selection process may apply a weighting factor to certain participants, from venue operator input or based on participant subscription tier. Also, the venue operator may direct the system 100 to insert specific promotional or advertising content. This content can promote the vendor's products, and can be tailored (e.g., chosen from a dedicated catalog.) Also this catalog can be dynamic, based on advertising live auction, etc.

In one embodiment, the content provider may work out a deal with the venue operator for a maximum number of subscriptions at the venue. Such subscription arrangement may allow the content to be displayed if a certain percentage of the patrons subscribe to the content, i.e., where the venue operator would only be responsible for the remaining percentage of viewers without a subscription. This deal would more fairly compensate the content provider while offering an affordable price to the venue operator, as credit would be provided for subscribers in the venue 140 who already have subscriptions to the content.

In another embodiment, the content selection criteria may be extended to live performances. For example, live performers may receive information from the system concerning the characteristics of the viewing group present in a venue, and may use the information to alter their performance, creating tailored marketing messages (either live, broadcast, or recorded), or e-commerce opportunities.

Next, in step 210, the system 100 senses that a first group of viewers of the plurality of viewers is approaching a viewing range of a display device. This sensing can be accomplished from imaging data, e.g., a camera mounted near the display device, or by other proximity sensing means.

The system 100 can provide social interaction among the first group of viewers. For example, if the first group of viewers are fans of a sports team, system 100 could provide a SMS notification or call to action via mobile application alerting the participants of the formation of the group. In addition, the system 100 could set up a virtual chat room for the first group of viewers to comment on the content. The virtual chat room may aggregate posts from the first group of viewers, such as tweets, Instagram, Facebook, or the like. In addition, advertising or merchandizing could be directed towards this first group of viewers.

Next in step 212, the system 100 determines whether there is a conflict between the content viewing preferences of the first group of viewers. For example, some content may be favored by a first faction in the first group, whereas other content may be favored by a second faction. A classic example would be fans of the New York Yankees in the first faction, fans of the Boston Red Sox in the second faction, where the two baseball teams are not playing a game against each other, but are playing games in different stadiums at the same time. The avid fans of each faction would desire to watch their respective team's games, but the venue 140 may not accommodate such arrangement.

In an embodiment, the system 100 may dynamically switch content based on changes to the composition of the viewing group. However, to avoid viewer dissatisfaction, content changes may be restricted to occur at program breaks in the content. The system may predictively determine the content in advance of program breaks, so that longer programs are selected before the arrival of participants to the venue 140. For example, the venue 140 may be a waiting room for a service provider, and the participants may be scheduled to arrive after the beginning of a program break. The system 100 may predictively select the content before participant arrival.

Short form content, such as clips posted to social media sites, may offer more flexibility for content switching. As the current content concludes, the choice for subsequent content is altered based on the group characteristics. Short form content can be tailored (e.g., chosen from a dedicated catalog) by the venue operator. The catalog of short form content can be dynamic, i.e., based on advertising, live auction by the viewing group participants, etc. A playlist for the short form content can be generated. Content selection may be supplemented by participant vote.

In another embodiment, the system 100 may also provide an alert that notifies viewers, just prior to the content being switched, on the display itself. Alternatively, alerts or notifications to individual participants may be provided to the participant's mobile device, through SMS text messaging, in app notification, or the like. If the content is not appropriate or desirable, the participant may choose to leave that area of the venue 140. In another embodiment, the system 100 may also provide viewers with an identification of the one or more display devices in the venue and a listing of content that is currently being displayed on the one or more display devices in the venue. The system 100 may provide this information to the viewers' mobile devices by an app, or may generate a website that will display the information and send a URL to the viewers' mobile devices for viewing the website.

In the event of a conflict, the system 100 must resolve the conflict so that the content may be displayed. The resolution may be based on weighting the viewing preferences of the first group of viewers, thereby creating a content selection from the list of content. The automatic content selection implemented by system 100 may be augmented by viewer voting. For example, a vocal or visual poll, or in app poll, may be taken at the venue by the system 100. As mentioned above, the system 100 can also create a rank ordered list that can be mapped to the displays in the venue 140.

Finally, in step 216, the system 100 displays content from the list of content according to the content selection. As set forth above, the displays may have a natural priority ranking based on their size or prominence in the venue 140, and the ordered list of content can be commensurately mapped to the display ranking to display the content from the list.

While for purposes of simplicity of explanation, the respective processes are shown and described as a series of blocks in FIG. 2, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
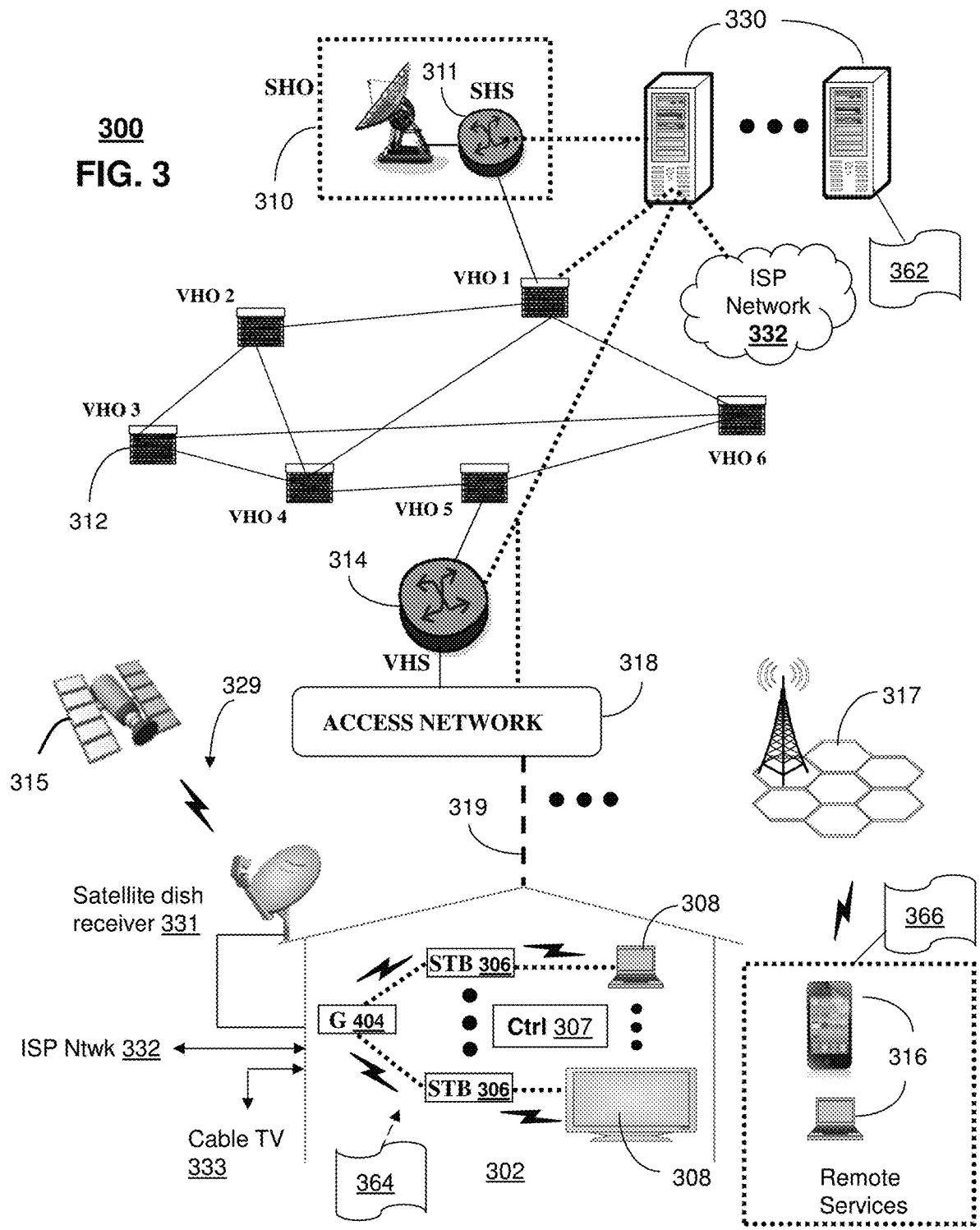
FIG. 3 depict illustrative embodiments of a communication system that provide media content selected by the system 100 described in FIG. 1.

FIG. 3 depicts an illustrative embodiment of a first communication system 300 for delivering media content. The communication system 300 can represent an Internet Protocol Television (IPTV) media system. Communication system 300 can be overlaid or operably coupled with system 100 of FIG. 1 as another representative embodiment of communication system 300. For instance, one or more devices illustrated in the communication system 300 of FIG. 3 can provide the functionality of control server 150 that implements the service, or content server 160, that provides the content. Additionally, media processor 306 and media display devices 308 at building premises 302 described below can fulfill the role of set-top box 146 and display 148, respectively, at the venue 140. Further, the access network 318 described below can be the transporter of the content, fulfilling the role of network 110 described above.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol. In aggregate, SHO 310, SHS 311, VHO 312 and VHS 314 form a content source 170 described above.

The VHS 314 can distribute multimedia broadcast content via an access network 318 to building premises 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to building premises 302. The gateway 304 can use communication technology to distribute broadcast signals to media processors 306 such as Set-Top Boxes (STBs) which in turn present broadcast channels to media display devices 308 such as computers or television sets managed in some instances by a media controller 307 (such as an infrared or RF remote controller).

The gateway 304, the media processors 306, and media display devices 308 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building premises 302. Modulated signals received by the satellite dish receiver 331 can be transferred to the media processors 306 for demodulating, decoding, encoding, and/or distributing broadcast channels to the media display devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services. System 300 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media display devices 308 or wireless communication devices 316.

Communication system 300 can also provide for all or a portion of the computing devices 330 to function as a control server (herein referred to as control server 330). The control server 330 can use computing and communication technology to perform software application function 362, which can include among other things, the system 100 techniques described by method 200 of FIG. 2. For instance, software application function 362 of control server 330 can be similar to the functions described for control server 150 of FIG. 1 in accordance with method 200. The media processors 306 and wireless communication devices 316 can be provisioned with software application functions 364 and 366, respectively, to utilize the services of control server 330. For instance, software application functions 364 and 366 of media processors 306 and wireless communication devices 316 can be similar to the functions described for the set-top box 146 and location tracking devices 130 of FIG. 1, respectively, in accordance with method 200 of FIG. 2.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
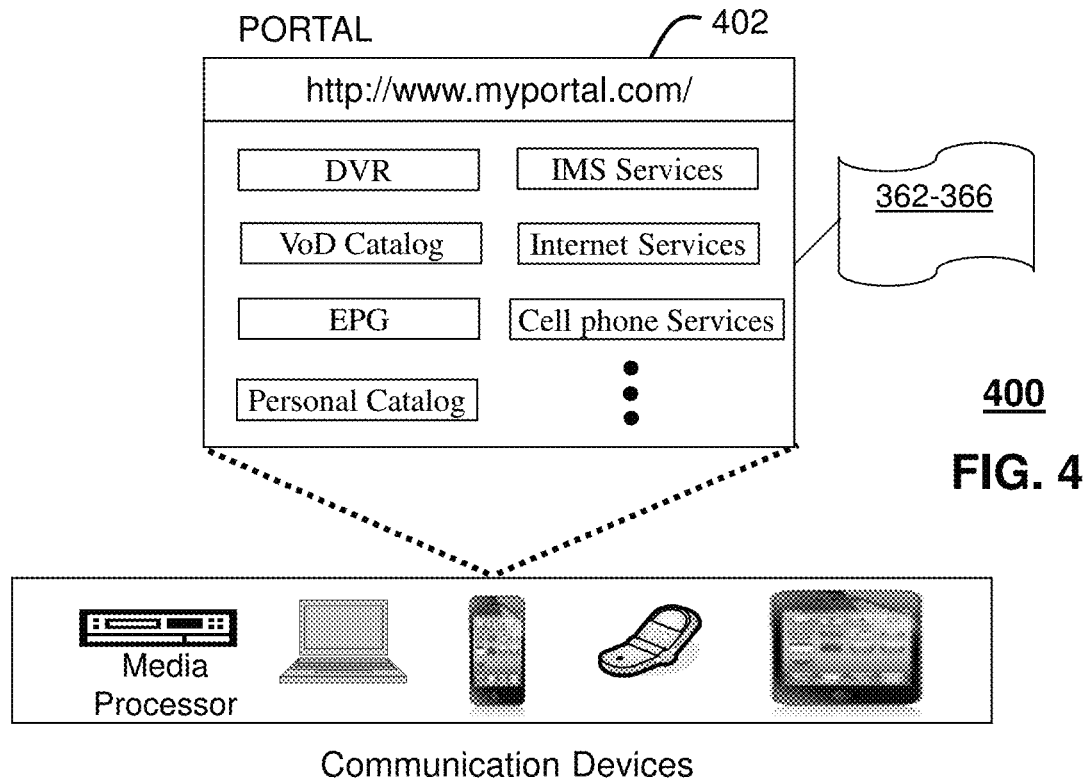
FIG. 4 depicts an illustrative embodiment of a web portal for interacting with the communication systems of FIGS. 1 and 3.

FIG. 4 depicts an illustrative embodiment of a web portal 402 of a communication system 400. Communication system 400 can be overlaid or operably coupled with system 100 of FIG. 1, and/or communication system 300 as another representative embodiment of system 100 of FIG. 1, and/or communication system 300. The web portal 402 can be used for managing services of system 100 of FIG. 1 and communication system 300. A web page of the web portal 402 can be accessed by a Uniform Resource Locator (URL) with an Internet browser using an Internet-capable communication device such as those described in FIG. 1 and FIG. 3. The web portal 402 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 402 can also be used for provisioning IMS services described earlier, provisioning Internet services, provisioning cellular phone services, and so on.

The web portal 402 can further be utilized to manage and provision software application functions 362-366 to adapt these applications as may be desired by subscribers and/or service providers of system 100 of FIG. 1 and communication system 300. For instance, users of the services provided by control server 150 or control server 330 can log into their on-line accounts and provision the control servers 150 or 330 with profile data associated with each viewer of the plurality of viewers to obtain a content viewing preference of each viewer, monitored user viewing history, location tracking devices, parental controls, and provide contact information to control servers 150 and 330 to enable it to communication with devices described in FIGS. 1 and 3, and so on. Service providers can log onto an administrator account to provision, monitor and/or maintain the system 100 of FIG. 1 or control server 330.

Figure 5:
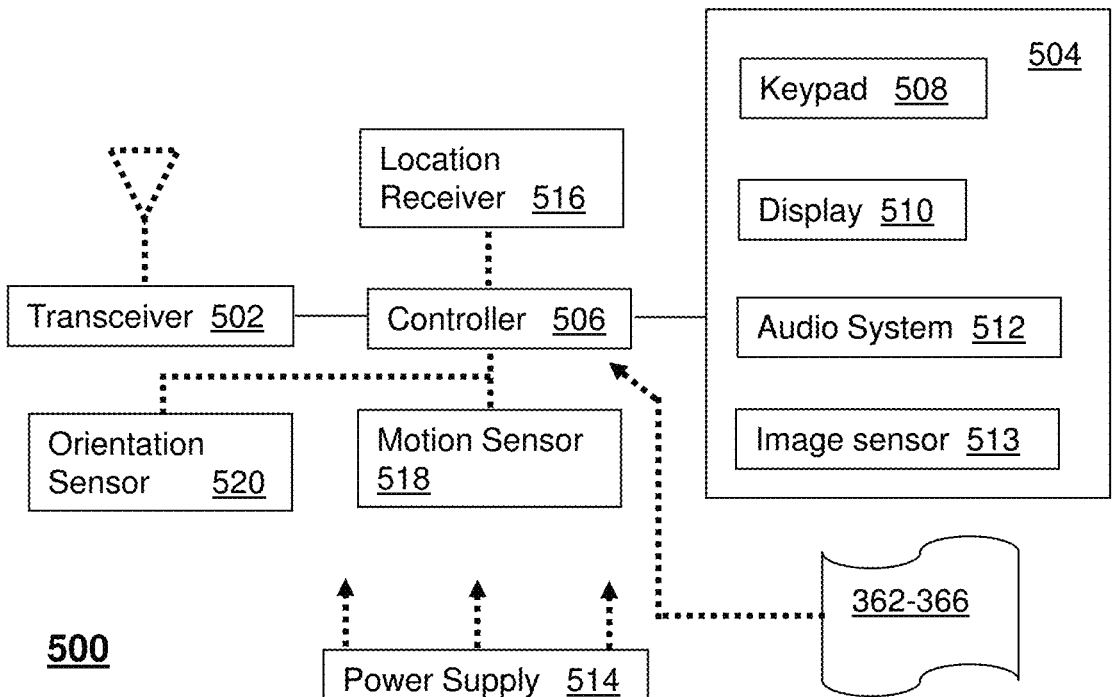
FIG. 5 depicts an illustrative embodiment of a communication device.

FIG. 5 depicts an illustrative embodiment of a communication device 500. Communication device 500 can serve in whole or in part as an illustrative embodiment of the devices depicted in FIG. 1 and FIG. 3 and can be configured to perform portions of method 200 of FIG. 2.

Communication device 500 can comprise a wireline and/or wireless transceiver 702 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of location tracking devices 130, set-top box 146, display 148 and/or control server 150 of FIG. 1, the media processor 306, the media display devices 308, or the portable wireless communication devices 316 of FIG. 3. It will be appreciated that the communication device 500 can also represent other devices that can operate in system 100 of FIG. 1 and communication system 300 of FIG. 3, such as a gaming console and a media player. In addition, the controller 506 can be adapted in various embodiments to perform the software application functions 362-366, respectively.

Upon reviewing the aforementioned embodiments, it would be evident to an artisan with ordinary skill in the art that said embodiments can be modified, reduced, or enhanced without departing from the scope of the claims described below. For example, although the invention is describe in terms of video content such as live television broadcasts, the concepts apply as well to video on demand selection from a catalog of content, and audio media such as music or audio books. For example, an audio playlist may be altered as a function of the guests attending a party. Further, the group-based automated content selection concepts disclosed here can also be for other applications such as: providing input to live performers to alter their performance for the audience present, creating tailored marketing messages (either live, broadcast, or recorded), or e-commerce opportunities. Further, if subscriber attributes such as age are known, the presentation or venue actions can be altered accordingly. For example, if a significant fraction of the audience is determined to be over 18 years old, then the venue can offer the sale of lottery tickets or legalized gambling, such as sports betting.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
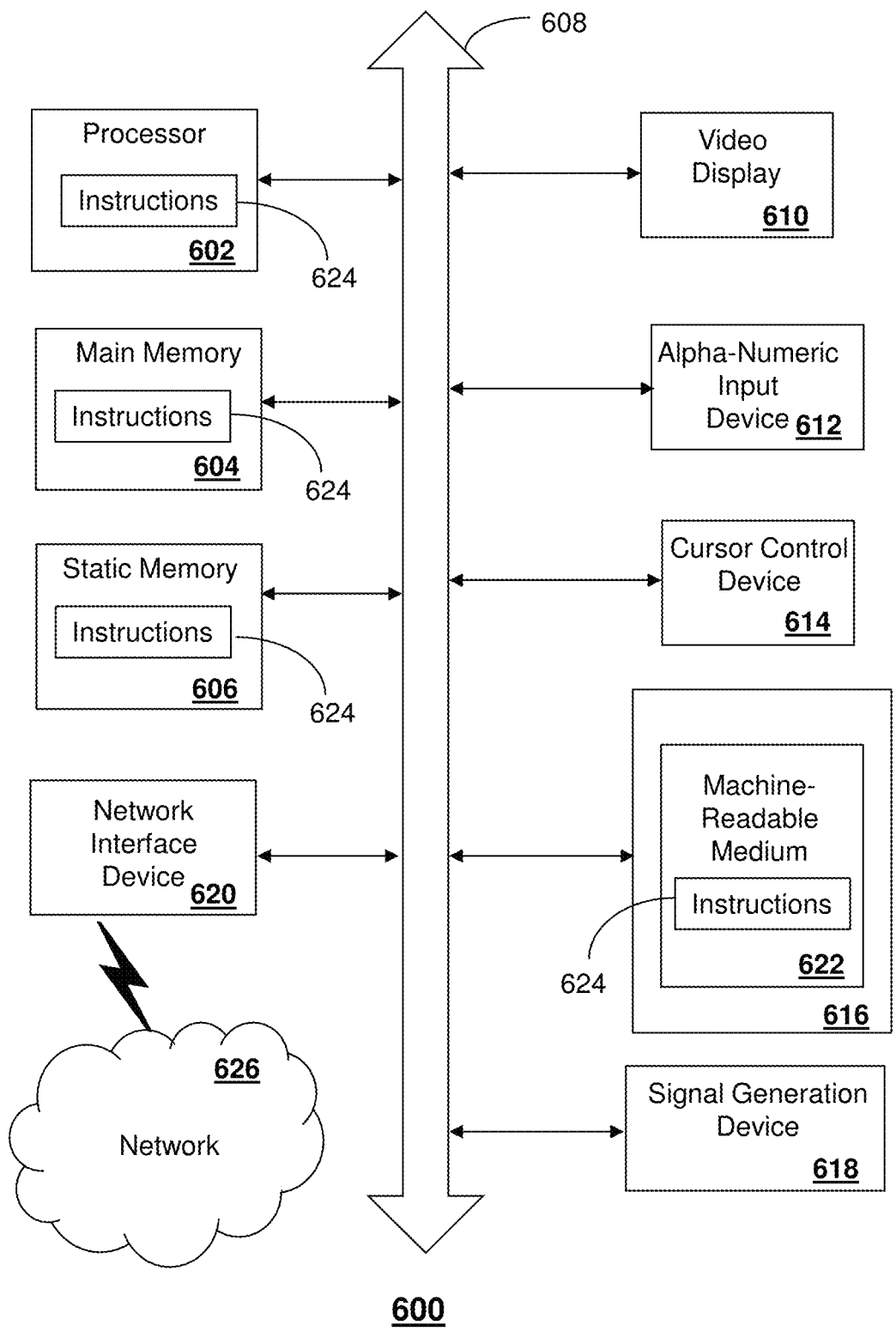
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the location tracking device 130, the set-top box 146, the control server 150, the content server 160, the control server 330, the media processor 306 and other devices of FIGS. 1 and 3. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible machine-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions for the perform of operations or methods may perform such operations directly or indirectly by way of one or more intermediate devices directed by the computing device.

While the tangible machine-readable storage medium 622 is shown in an example embodiment to be a single medium, the term "tangible machine-readable storage medium" should be taken to include a single medium or multiple media (e.g., a centralized or distributed database, and/or associated caches and servers) that store the one or more sets of instructions. The term "tangible machine-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible machine-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible machine-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations, the operations comprising:
    determining whether a plurality of viewers in proximity to one or more display devices are each permitted to view content items included in a list according to subscription agreements associated with the plurality of viewers; and
    sending a particular content item of the content items to a display device of the one or more display devices according to a determination that a threshold percentage of the plurality of viewers are permitted to view the particular content item based on the subscription agreements.

2. The non-transitory machine-readable storage medium of claim 1, wherein the operations further comprise:
    receiving location information from a mobile communication device of a particular viewer of the plurality of viewers;
    identifying the particular viewer according to the location information; and
    sending targeted advertising for the plurality of viewers to the display device in accordance with the identifying.

3. The non-transitory machine-readable storage medium of claim 1, wherein the operations further comprise selecting the particular content item based on weighting viewing preferences of the plurality of viewers.

4. The non-transitory machine-readable storage medium of claim 1, wherein the operations further comprise:
    generating the list,
    wherein the generating of the list includes determining a prior location of the plurality of viewers in a vicinity of the one or more display devices.

5. The non-transitory machine-readable storage medium of claim 1, wherein the operations further comprise:
    generating the list,
    wherein the generating of the list includes restricting the list of content items based on input from an operator of a venue comprising the one or more display devices.

6. The non-transitory machine-readable storage medium of claim 1, wherein the operations further comprise:
    notifying the plurality of viewers of a formation of the plurality of viewers.

7. The non-transitory machine-readable storage medium of claim 1, wherein the operations further comprise:
    providing the plurality of viewers with a virtual chat room.

8. The non-transitory machine-readable storage medium of claim 1, wherein the operations further comprise:
    displaying targeted advertising to the plurality of viewers.

9. The non-transitory machine-readable storage medium of claim 1, wherein the operations further comprise:
    ranking the one or more display devices and mapping the ranking to content items from the list for display on the one or more display devices.

10. The non-transitory machine-readable storage medium of claim 2, wherein loyalty credits are awarded based on spending habits of each viewer in the plurality of viewers in a venue comprising the one or more display devices.

11. The non-transitory machine-readable storage medium of claim 10, wherein the loyalty credits are awarded based on a frequency of attending the venue.

12. The non-transitory machine-readable storage medium of claim 4, wherein the prior location is associated with a sporting event and the list includes programs related to the sporting event.

13. The non-transitory machine-readable storage medium of claim 5, wherein the venue is a sports bar and the list of content items is restricted to sporting events.

14. The non-transitory machine-readable storage medium of claim 5, wherein the venue is a daycare center and the list of content items is restricted to children's content.

15. A device, comprising:
a processing system including a processor; and
a memory that stores executable instructions that, when executed by the processing system, facilitate performance of operations, comprising:
generating a list of content items for display on a display device proximate to a plurality of identified viewers; and
sending a particular content item included in the list to the display device according to a determination that a threshold percentage of the plurality of identified viewers are permitted to view the particular content item based on an analysis of subscription agreements associated with the plurality of identified viewers.

16. The device of claim 15, wherein the operations further comprise:
receiving location information from a mobile communication device of a particular viewer of the plurality of identified viewers;
identifying the particular viewer according to the location information; and
sending targeted advertising for the plurality of identified viewers to the display device in accordance with the identifying.

17. The device of claim 16, wherein the operations further comprising awarding loyalty credits to the particular viewer based on the mobile communication device being in proximity to the display device.

18. A method, comprising:
analyzing, by a processing system including a processor, subscription agreements associated with a plurality of viewers proximal to a display device to determine whether the plurality of viewers are each permitted to view content items; and
sending, by the processing system, a particular content item of the content items to the display device according to a determination that a threshold percentage of the plurality of viewers are permitted to view the particular content item based on the analyzing of the subscription agreements.

19. The method of claim 18, further comprising:
receiving, by the processing system, location information from a mobile communication device of a particular viewer of the plurality of viewers;
identifying, by the processing system, the particular viewer according to the location information; and
sending, by the processing system, targeted advertising for the plurality of viewers to the display device in accordance with the identifying.

20. The method of claim 18, further comprising:
polling, by the processing system, viewing preferences of each of the plurality of viewers for the content items; and
adjusting, by the processing system, a list of content items based on the polling.

* * * * *